(12) United States Patent
Martinsen et al.

(10) Patent No.: US 8,854,413 B2
(45) Date of Patent: Oct. 7, 2014

(54) COMMUNICATING WITH AN ENDPOINT USING MATRIX BARCODES

(75) Inventors: Pål-Erik Martinsen, Ås (NO); Hani Mustafa Hashim, Oslo (NO); Rune Frøysa, Bekkestua (NO)

(73) Assignee: Cisco Technology, Inc., San Jose, CA (US)

( * ) Notice: Subject to any disclaimer, the term of this patent is extended or adjusted under 35 U.S.C. 154(b) by 228 days.

(21) Appl. No.: 13/486,419

(22) Filed: Jun. 1, 2012

(65) Prior Publication Data

US 2013/0321554 A1  Dec. 5, 2013

(51) Int. Cl.
*H04N 7/14* (2006.01)

(52) U.S. Cl.
CPC .................................. *H04N 7/14* (2013.01)
USPC ...................................................... 348/14.02

(58) Field of Classification Search
CPC ......... H04N 7/14; H04N 7/147; H04N 7/148; H04N 7/15; H04L 12/1813; G06K 7/1095
USPC ............. 348/14.01–14.16; 709/204; 235/380
See application file for complete search history.

(56) References Cited

U.S. PATENT DOCUMENTS

| | | | |
|---|---|---|---|
| 5,726,435 A | 3/1998 | Hara et al. | 235/294 |
| 7,523,111 B2 | 4/2009 | Walmsley | 707/9 |
| 7,764,835 B2 | 7/2010 | Takakura et al. | 382/168 |
| 8,013,905 B2 | 9/2011 | Silverbrook | 348/222.1 |
| 2005/0031092 A1 | 2/2005 | Umemura et al. | |
| 2009/0288159 A1 | 11/2009 | Husemann et al. | |
| 2012/0023167 A1* | 1/2012 | Hovdal et al. | 709/204 |
| 2013/0126619 A1* | 5/2013 | Del Fiume et al. | 235/492 |
| 2013/0155173 A1* | 6/2013 | Brady et al. | 348/14.03 |

FOREIGN PATENT DOCUMENTS

| | | |
|---|---|---|
| EP | 2 364 043 A1 | 9/2011 |
| WO | WO 2011/007254 | 1/2011 |

OTHER PUBLICATIONS

PCT Notification of Transmittal of the International Search Report and the Written Opinion of the International Searching Authority, or the Declaration: mailed Sep. 10, 2013; international application No. PCT/US2013/042192; 10 pages.

* cited by examiner

*Primary Examiner* — Melur Ramakrishnaiah
(74) *Attorney, Agent, or Firm* — Baker Botts L.L.P.

(57) ABSTRACT

In one embodiment, a method includes receiving, by an endpoint from a client, an image generated by the client. The endpoint determines that the image generated by the client includes a matrix barcode. The endpoint decodes the matrix barcode to determine one or more instructions associated with text encoded within the matrix barcode. The method further includes performing the one or more instructions associated with the encoded text.

15 Claims, 3 Drawing Sheets

US 8,854,413 B2

COMMUNICATING WITH AN ENDPOINT USING MATRIX BARCODES

TECHNICAL FIELD

The present disclosure relates generally to telecommunications and more specifically to communicating with an endpoint using matrix barcodes.

BACKGROUND

A client, such as a laptop, may interface with an endpoint in order to utilize functionality provided by the endpoint. An endpoint is a computing system that includes resources that may be accessed by the client. One example of an endpoint is a telepresence system. A telepresence system generally includes high quality video and audio input and output and may be used for videoconferencing and other collaboration. When a client interfaces with a telepresence system, the client may access, for example, a video camera, microphone, display, and speaker system of the telepresence system.

BRIEF DESCRIPTION OF THE DRAWINGS

For a more complete understanding of the present disclosure and its features and advantages, reference is now made to the following description, taken in conjunction with the accompanying drawings, in which.

DESCRIPTION OF EXAMPLE EMBODIMENTS

Overview

According to one embodiment, a method includes receiving, by an endpoint from a client, an image generated by the client. The endpoint determines that the image generated by the client includes a matrix barcode. The endpoint decodes the matrix barcode to determine one or more instructions associated with text encoded within the matrix barcode. The method further includes performing the one or more instructions associated with the encoded text.

Certain embodiments of the disclosure may provide one or more technical advantages. A technical advantage of one embodiment is that a client may communicate with an endpoint by sending an image of a matrix barcode in a video stream to the endpoint. Another technical advantage of one embodiment is that a client may be logged into an endpoint by providing user credentials through a video stream between the client and the endpoint. Another technical advantage of one embodiment is that an instruction may be performed by an endpoint in response to detecting a matrix barcode encoding the instruction or text associated with the instruction in a video stream from the client.

Certain embodiments of the disclosure may include none, some, or all of the above technical advantages. One or more other technical advantages may be readily apparent to one skilled in the art from the figures, descriptions, and claims included herein.

DESCRIPTION

Figure 1:
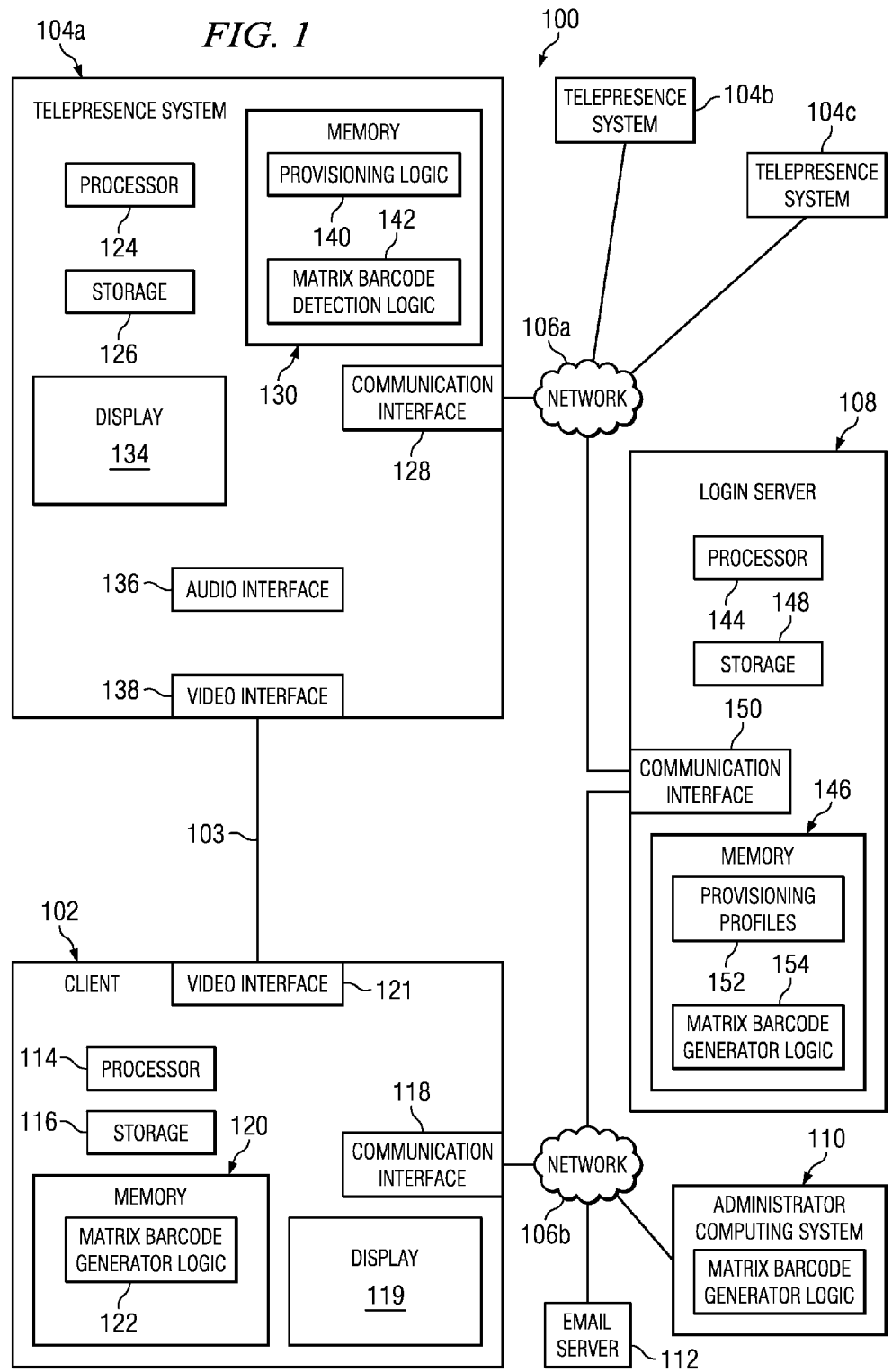
FIG. 1 depicts an example system in which an example client communicates with an example telepresence system using a matrix barcode.

FIG. 1 depicts an example system 100 in which an example client 102 communicates with an example telepresence system 104a using a matrix barcode. System 100 includes client 102 coupled to telepresence system 104a via connection 103. System 100 also includes other telepresence systems 104b and 104c and login server 108 coupled to telepresence system 104a via network 106a, and login server 108, administrator computing system 110, and email server 112 coupled to client 102 via network 106b.

Client 102 may interface with telepresence system 104a in order to access resources and functionality provided by the telepresence system. For example, client 102 may utilize video and audio input and output of telepresence system 104a to communicate with telepresence systems 104b and 104c in a videoconference, presentation, or other communication session. Telepresence system 104a may be configured to provide access to certain resources or functionality only after it has determined that client 102 is authorized to access telepresence system 104a. For example, telepresence system 104a may require user credentials, such as a valid user name and password from client 102 before allowing client 102 to control certain aspects of telepresence system 104a. In some situations, it may be cumbersome for client 102 to communicate user credentials to telepresence system 104a. For example, client 102 and telepresence system 104a may be coupled to different networks that do not share information with each other. As another example, in particular embodiments, telepresence system 104a is not configured with a keyboard or similar input device or is not configured to accept user credentials from such input devices.

In particular embodiments of the present disclosure, client 102 is operable to generate an image that includes a matrix barcode with encoded text. The encoded text may include user credentials or other text associated with an operation that may be performed by telepresence system 104a. The image is presented to telepresence system 104a, for example, in a video stream sent from client 102 to telepresence system 104a via connection 103. Telepresence system 104a scans the image, determines that a matrix barcode is included in the image, and decodes the text. Telepresence system 104a then acts in accordance with the decoded text. For example, telepresence system 104a may initiate a login sequence if the text includes user credentials. After verifying the user credentials, telepresence system 104a may allow client 102 to access functionality of telepresence system 104a or customize itself according to a profile associated with the user credentials. As another example, telepresence system 104a may establish a communication session with another endpoint, if the text includes identification information associated with the other endpoint. In various embodiments, telepresence system 104a may perform any suitable instruction associated with the decoded text.

System 100 includes any suitable number of telepresence systems 104. A telepresence system 104 may include any suitable hardware, software, or other elements for facilitating a communication session, such as a videoconference, with another telepresence system 104, client 102, or other endpoint. In the illustrated embodiment, telepresence system 104 includes processor 124, storage 126, communication interface 128, memory 130, display 134, audio interface 136, and video interface 138. Processor 124, storage 126, communication interface 128, and memory 130 will be described in further detail below.

In the embodiment depicted, memory 130 includes provisioning logic 140. Provisioning logic 140 may be operable to configure telepresence system 104a. For example, such configuration may include allowing or disallowing access by client 102 to particular functions or resources of telepresence system 104a. In particular embodiments, provisioning logic 140 receives user credentials, checks the credentials against valid credentials stored by telepresence system 104a, login server 108, or other suitable entity, and initiates a login sequence if the received user credentials are valid. Configuration performed by provisioning logic may also include customizing any suitable features for a user of telepresence system 104a, such as desktop settings, audio setting, video settings, or other suitable settings. Customized settings for a user may be associated with the user credentials of the user and stored at telepresence system 104a, in provisioning profiles 152 of login server 108, or other location. These settings may be retrieved by provisioning logic 140 during provisioning of telepresence system 104a. In particular embodiments, configuration by provisioning logic 140 is performed in response to a detection by telepresence system 104a of valid user credentials encoded in an image of a matrix barcode generated by client 102.

Memory 130 may also include matrix barcode detection logic 142. Matrix barcode detection logic 142 may be operable to receive an image, such as a bitmap, and determine whether a matrix barcode is in the image. Matrix barcode detection logic 142 may also identify text that is encoded within a matrix barcode depicted in the image. Matrix barcode detection logic 142 may be operable to decode any suitable matrix barcode and may include any suitable matrix barcode reader.

Audio interface 136 may include any suitable hardware, software, or other elements that facilitate audio input and output. For example, audio interface 136 may include one or more speakers, microphones, controllers for processing audio data, or other suitable elements. Video interface 138 may include any suitable hardware, software, or other elements that facilitate video input or output. For example, video interface 138 may include one or more video cameras, still cameras, controllers for processing video data, or other suitable elements. Cameras may include any suitable hardware and/or software to facilitate the capturing of an image. A video camera may capture and transmit its obtained images as a video signal (e.g., a high definition video signal). Video interface 138 may be operable to receive a video stream from connection 103 and perform any suitable processing of the video stream, such as capturing a frame of the video stream, converting the frame into a suitable image file for further processing, or converting the video stream into a suitable format for display by telepresence system 104a or transmission to other telepresence endpoints 104b and 104c.

Display 134 may include any suitable hardware, software, or other elements to facilitate the displaying of images. For example, display 134 may include a wall mounted monitor, a floor mounted monitor, or a free standing monitor. Display 134 may be a liquid crystal display (LCD), a light-emitting diode (LED) display, an LED-backlight LCD, or other suitable display. Display 134 may display images using any suitable technology that provides a realistic image, such as high definition, high-power compression hardware, and efficient encoding/decoding standards. Display 134 may be used to display other participants in a videoconference, a video stream from client 102, an image or video stream obtained by video interface 138, or other suitable images or video streams.

Client 102 represents any suitable computing device operable to interface with another endpoint, such as telepresence system 104a. Client 102 may include any suitable hardware, software, or other elements. In the embodiment depicted, client 102 includes processor 114, storage 116, communication interface 118, display 119, memory 120, and video interface 121. In the embodiment depicted, memory 120 includes matrix barcode generator logic 122 for receiving text and encoding the text in a matrix barcode. Processor 114, storage 116, communication interface 118, and memory 120 will be described in further detail below.

Display 119 may include any suitable hardware, software, or other elements to facilitate the displaying of images. For example, display 119 may include an LCD, an LED display, an LED-backlight LCD, or other suitable display. Display 119 may display images using any suitable technology. Display 119 may be used to display a video stream generated by client 102 (e.g., by the operating system of client 102) or telepresence system 104a or other suitable video or images.

Video interface 121 may include any suitable hardware, software, or other elements that facilitate video input or output. For example, video interface 121 may include one or more controllers for processing video data and transmitting the processed video data (e.g., a video stream) to display 119 or to an endpoint, such as telepresence system 104a, that client 102 interfaces with. Video interface 121 may include a video output port that interfaces with connection 103. In particular embodiments, video interface 121 sends a video stream to communication interface 118. Communication interface 118 then wirelessly transmits the video stream to a communication interface of the receiving endpoint, such as communication interface 128 of telepresence system 104a.

Connection 103 represents any suitable medium for communication between client 102 and telepresence system 104a. As an example, connection 103 may be a video cable such as a Video Graphics Array (VGA), Digital Visual Interface (DVI), or High-Definition Multimedia Interface (HDMI) video cable that connects video interface 121 to video interface 138. As another example connection 103 may be a line of sight between a camera of telepresence system 104a and display 119 of client 102, such that the camera may capture an image displayed by client 102.

In particular embodiments, telepresence system 104a and client 102 may include one or more additional connections. For example, one or more connections may be made between communication interface 118 and communication 128. These connections may carry any suitable data between client 102 and telepresence system 104a, such as user input, video data, audio data, file data, or other suitable data.

Login server 108 represents any suitable computing device operable to communicate with telepresence system 104a, client 102, or other endpoint. Login server 108 includes processor 144, memory 146, storage 148, and communication interface 150. Memory 146 includes provisioning profiles 152 and matrix barcode generator logic 154. Matrix barcode generator logic 154 is operable to receive text and encode the text within a matrix barcode. Provisioning profiles 152 may include any suitable information regarding various users. For example, provisioning profiles 152 may include user credentials associated with various users. As another example, provisioning profiles 152 may include provisioning characteristics, such as customized settings, associated with the users. The provisioning characteristics of a particular user may be associated with the user's user credentials or other identifier of the user. Login server 108 may be operable to verify that user credentials received from telepresence system 104a are valid by checking them against user credentials stored in provisioning profiles 152. Login server 108 may also be operable to provide information from provisioning profiles 152, such as customized settings associated with a particular user, to telepresence system 104a. Login server 108 may also be operable to communicate with client 102 to update user credentials or other provisioning characteristics of a user associated with client 102.

In particular embodiments, client 102 may provide user credentials, such as a user name and password to login server 108. As an example, login server 108 may provide a web page that client 102 may use to enter these user credentials and to request access to telepresence system 104a. Login server 108 may generate a temporary credential, such as a one time password. The temporary credential (alone or in combination with other suitable information such as the user's user name and password) may be encoded within a matrix barcode by matrix barcode generator logic 154 (or sent back to the client which encodes it into a matrix barcode using matrix barcode generator logic 122). The client 102 may generate an image with this matrix barcode and insert this image into a video stream sent from client 102 to telepresence system 104a. Telepresence system 104a may detect the matrix barcode and communicate with login server 108 to determine whether the matrix barcode includes valid credentials. Upon validation, telepresence system 104a may log the client 102 onto the telepresence system 104a or perform other suitable configuration.

Administrator computing system 110 represents a computing system associated with an administrator of at least a portion of system 100. The administrator computing system 110 may be operable to generate user credentials and transmit the user credentials to client 102 via email server 112. For example, administrator computing system 110 may receive a request for access to one or more telepresence systems 104. In response to the request, administrator computing system 110 may generate one or more user credentials. Administrator computing system 110 may then generate a matrix barcode using matrix barcode generator logic 156 that encodes the user credentials. Administrator computing system 110 then transmits the matrix barcode to client 102. As an example, administrator computing system 110 may email the matrix barcode to client via email server 112. Email server 112 represents a computing system operable to receive, store, and transmit email messages on behalf of other computing systems such as client 102 and administrator computing system 110. As an alternative to generating the matrix barcode, administrator computing system 110 may generate the user credentials and transmit the user credentials to client 102. Client 102 may then use matrix barcode generator logic 122 to encode the credentials within a matrix barcode.

Networks 106a and 106b represents any suitable networks operable to facilitate communication between the components of system 100, such as client 102, telepresence systems 104, login server 108, administrator computing system 110, and email server 112. Network 106 may include any interconnecting system capable of transmitting audio, video, signals, data, messages, or any combination of the preceding. Network 106 may include all or a portion of a public switched telephone network (PSTN), a public or private data network, a local area network (LAN), a metropolitan area network (MAN), a wide area network (WAN), a local, regional, or global communication or computing system network, such as the Internet, a wireline or wireless network, an enterprise intranet, or any other suitable communication link, including combinations thereof, operable to facilitate communication between the components.

FIG. 1 depicts various examples of endpoints such as client 102, telepresence systems 104, login server 108, administrator computing system 110, and email server 112. An endpoint is a device that includes one or more portions of one or more computer systems. In particular embodiments, one or more of these computer systems may perform one or more steps of one or more methods described or illustrated herein. In particular embodiments, one or more computer systems may provide functionality described or illustrated herein. In particular embodiments, encoded software running on one or more computer systems may perform one or more steps of one or more methods described or illustrated herein or provide functionality described or illustrated herein.

The components of a client 102, a telepresence system 104, a login server 108, an administrator computing system 110, and an email server 112 may comprise any suitable physical form, configuration, number, type and/or layout. As an example, and not by way of limitation, client 102, telepresence system 104, login server 108, administrator computing system 110, and/or email server 112 may comprise an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, client 102, telepresence system 104, login server 108, administrator computing system 110, and/or email server 112 may include one or more computer systems; be unitary or distributed; span multiple locations; span multiple machines; or reside in a cloud, which may include one or more cloud components in one or more networks.

In the depicted embodiment, client 102, telepresence system 104, and login server 108 each include their own respective processors 114, 124, and 144; memory 120, 130, and 146; storage 116, 126, and 148; and interfaces 118, 128, and 150. Although not depicted, administrator computing system 110 and/or email server 112 may have similar components. Although a particular system 100 is depicted having a particular number of particular components in a particular arrangement, this disclosure contemplates any suitable system 100 having any suitable number of any suitable components in any suitable arrangement. For simplicity, similar components of client 102, telepresence system 104, and login server 108 will be discussed together while referring to the particular component of telepresence system 104a. However, it is not necessary for these devices to have the same components, or the same type of components. For example, processor 114 may be a general purpose microprocessor and processor 124 may be an application specific integrated circuit (ASIC).

Processor 124 may be a microprocessor, controller, or any other suitable computing device, resource, or combination of hardware, software and/or encoded logic operable to provide, either alone or in conjunction with other components, (e.g., memory 130) functionality described herein. Additional examples and functionality provided, at least in part, by processor 124 will be discussed below.

In particular embodiments, processor 124 may include hardware for executing instructions, such as those making up a computer program. As an example and not by way of limitation, to execute instructions, processor 124 may retrieve (or fetch) instructions from an internal register, an internal cache, memory 130, or storage 126; decode and execute them; and then write one or more results to an internal register, an internal cache, memory 130, or storage 126.

In particular embodiments, processor 124 may include one or more internal caches for data, instructions, or addresses. This disclosure contemplates processor 124 including any suitable number of any suitable internal caches, where appropriate. As an example and not by way of limitation, processor 124 may include one or more instruction caches, one or more data caches, and one or more translation lookaside buffers (TLBs). Instructions in the instruction caches may be copies of instructions in memory 130 or storage 126 and the instruction caches may speed up retrieval of those instructions by processor 124. Data in the data caches may be copies of data in memory 130 or storage 126 for instructions executing at processor 124 to operate on; the results of previous instructions executed at processor 124 for access by subsequent instructions executing at processor 124, or for writing to memory 130, or storage 126; or other suitable data. The data caches may speed up read or write operations by processor 124. The TLBs may speed up virtual-address translations for processor 124. In particular embodiments, processor 124 may include one or more internal registers for data, instructions, or addresses. Depending on the embodiment, processor 124 may include any suitable number of any suitable internal registers, where appropriate. Where appropriate, processor 124 may include one or more arithmetic logic units (ALUs); be a multi-core processor; include one or more processors; or any other suitable processor.

Memory 130 may be any form of volatile or non-volatile memory including, without limitation, magnetic media, optical media, random access memory (RAM), read-only memory (ROM), flash memory, removable media, or any other suitable local or remote memory component or components. In particular embodiments, memory 130 may include random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM, or any other suitable type of RAM or memory. Memory 130 may include one or more memories, where appropriate. Memory 130 may store any suitable data or information utilized by telepresence system 104*a*, including software embedded in a computer readable medium, and/or encoded logic incorporated in hardware or otherwise stored (e.g., firmware). In particular embodiments, memory 130 may include main memory for storing instructions for processor 124 to execute or data for processor 124 to operate on. In particular embodiments, one or more memory management units (MMUs) may reside between processor 124 and memory 130 and facilitate accesses to memory 130 requested by processor 124.

As an example and not by way of limitation, telepresence system 104*a* may load instructions from storage 126 or another source (such as, for example, another computer system) to memory 130. Processor 124 may then load the instructions from memory 130 to an internal register or internal cache. To execute the instructions, processor 124 may retrieve the instructions from the internal register or internal cache and decode them. During or after execution of the instructions, processor 124 may write one or more results (which may be intermediate or final results) to the internal register or internal cache. Processor 124 may then write one or more of those results to memory 130. In particular embodiments, processor 124 may execute only instructions in one or more internal registers or internal caches or in memory 130 (as opposed to storage 126 or elsewhere) and may operate only on data in one or more internal registers or internal caches or in memory 130 (as opposed to storage 126 or elsewhere).

In particular embodiments, storage 126 may include mass storage for data or instructions. As an example and not by way of limitation, storage 126 may include a hard disk drive (HDD), a floppy disk drive, flash memory, an optical disc, a magneto-optical disc, magnetic tape, or a Universal Serial Bus (USB) drive or a combination of two or more of these. Storage 126 may include removable or non-removable (or fixed) media, where appropriate. Storage 126 may be internal or external to telepresence system 104*a*, where appropriate. In particular embodiments, storage 126 may be non-volatile, solid-state memory. In particular embodiments, storage 126 may include read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Storage 126 may take any suitable physical form and may comprise any suitable number or type of storage. Storage 126 may include one or more storage control units facilitating communication between processor 124 and storage 126, where appropriate.

In particular embodiments, communication interface 128 may include hardware, encoded software, or both providing one or more interfaces for communication (such as, for example, packet-based communication) between telepresence systems 104 or other endpoints such as client 102, login server 108, administrator computing system 110, or email server 112, any networks, any network devices, and/or any other computer systems. As an example and not by way of limitation, communication interface 128 may include a network interface controller (NIC) or network adapter for communicating with an Ethernet or other wire-based network and/or a wireless NIC (WNIC) or wireless adapter for communicating with a wireless network.

In some embodiments, communication interface 128 may include one or more interfaces for one or more I/O devices. One or more of these I/O devices may enable communication between a person and telepresence system 104*a*. As an example and not by way of limitation, an I/O device may include a keyboard, keypad, microphone, monitor, mouse, printer, scanner, speaker, still camera, stylus, tablet, touch-screen, trackball, video camera, another suitable I/O device or a combination of two or more of these. An I/O device may include one or more sensors. Particular embodiments may include any suitable type and/or number of I/O devices and any suitable type and/or number of communication interfaces 128 for them. Where appropriate, communication interface 128 may include one or more drivers enabling processor 124 to drive one or more of these I/O devices. Communication interface 128 may include one or more communication interfaces 128, where appropriate.

A computing system may also include one or more buses. A bus may include any combination of hardware, software embedded in a computer readable medium, and/or encoded logic incorporated in hardware or otherwise stored (e.g., firmware) to couple components of telepresence system 104*a* to each other. As an example and not by way of limitation, a bus may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI- Express (PCI-X) bus, a serial advanced technology attachment (SATA) bus, a Video Electronics Standards Association local (VLB) bus, or any other suitable bus or a combination of two or more of these. A bus may include any number, type, and/or configuration of buses, where appropriate. In particular embodiments, one or more buses (which may each include an address bus and a data bus) may couple processor 124 to memory 130. A bus may include one or more memory buses.

Herein, reference to a computer-readable storage medium encompasses one or more tangible computer-readable storage media possessing structures. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

Particular embodiments may include one or more computer-readable storage media implementing any suitable storage. In particular embodiments, a computer-readable storage medium implements one or more portions of processor 124 (such as, for example, one or more internal registers or caches), one or more portions of memory 130, one or more portions of storage 126, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

Herein, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Perl, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language.

Although certain steps are described above as being performed by certain components, in general, the steps may be performed by any suitable components. Although FIG. 1 illustrates a telepresence systems 104, client 102, login server 108, administrator computing system 110, and email server 112, FIG. 1 contemplates any number or arrangement of such components for performing operations related to communicating using matrix barcodes.

Figure 2:
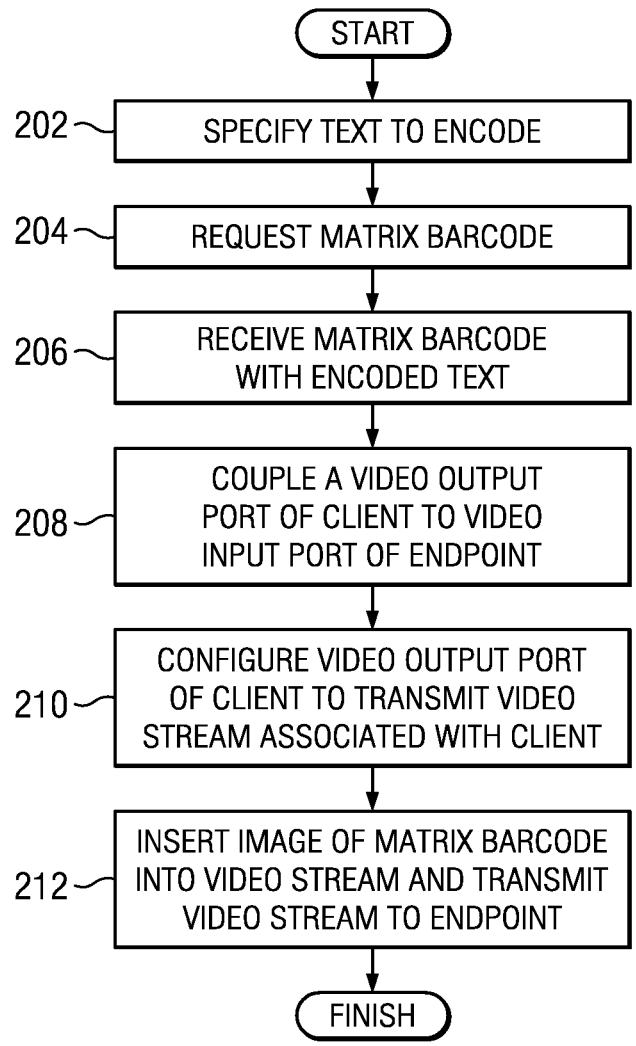
FIG. 2 depicts an example method for communicating using a matrix barcode that may be performed by the client of FIG. 1.

FIG. 2 depicts an example method for communicating using a matrix barcode. Although the steps of the method are illustrated herein as being performed by client 102, any suitable endpoint may perform one or more of the steps of the method. Similarly, though the description of the method contemplates communication between client 102 and telepresence system 104a, the communication may occur between any two suitable endpoints. The method begins at 202, where client 102 specifies text for encoding. The text may include any suitable characters, such as letters, numbers, other characters, or other suitable representations of information. Examples of text that may be specified include user credentials, such as user names, passwords, tokens, or pins; phone numbers; email addresses; web addresses; instructions to perform one or more functions; or other suitable information. In particular embodiments, the text specified at step 202 is received at client 102 (e.g., in response to a request for the text by client 102). For example, client 102 may request user credentials or other text from administrator computing system 110 or login server 108. In various embodiments, the text may be generated in response to user input, such as the clicking of a hyperlink. For example, a user browsing a directory may click on a hyperlink associated with another user and text including the phone number or uniform resource identifier (URI) of the other user may be generated. Optionally, an instruction to establish a communication session with the other user could be included in the generated text.

At step 204, a matrix barcode is requested. The request may include an indication that particular text should be encoded within a matrix barcode. The request for the matrix barcode may include the text specified at step 202. Alternatively, the request for the matrix barcode may be sent along with a request for the particular text to be encoded in the matrix barcode. For example, client 102 may request a matrix barcode with encoded user credentials from another endpoint, such as administrator computing system 110 or login server 108. As another example, a user of client 102 may click on a hyperlink that may include a phone number or URI and a request for a matrix barcode that encodes the phone number or URI (and optionally an instruction to dial the phone number or access the URI) may be generated.

Client 102 may request a matrix barcode from any suitable entity. For example, client 102 may request the matrix barcode from matrix barcode generator logic 122 of client 102. As another example, client 102 may request the matrix barcode from administrator computing system 110 or login server 108. These entities may utilize their respective matrix barcode generator logic 154 or 156 to fulfill the request.

A matrix barcode may be a one or two-dimensional matrix consisting of cells or modules of different colors (e.g., black and white) arranged in a particular pattern. For example, the cells may be arranged in a square or rectangular pattern. The matrix barcode may encode one or more bytes of data, such as text. In particular embodiments, the matrix barcode is a Quick Response (QR) code, a Data Matrix code, a Universal Product Code (UPC), or other suitable barcode. In particular embodiments, the matrix barcode may encode any one or more characters from the American Standard Code for Information Interchange (ASCII) character set. In particular embodiments, each cell of at least some of the cells of the matrix barcode represents at least a bit of encoded data. The matrix barcode may use any suitable geometry for the cells, such as lines, squares, rectangles, or other shapes.

Figure 4:
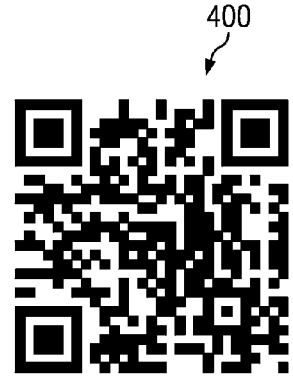
FIG. 4 depicts an example matrix barcode that may be used to communicate in the system of FIG. 1.

An example matrix barcode is shown in FIG. 4. This particular matrix barcode is a QR code that encodes the text "username: johndoe; password: abc123." As depicted, the encoded text is represented by a collection of black and white squares placed within a square pattern.

At step 206, client 102 receives the matrix barcode with the encoded text. Client 102 may receive the matrix barcode from any suitable entity. For example, client 102 may receive the matrix barcode from matrix barcode generator logic 122 of client 102, administrator computing system 110, or login server 108. The matrix barcode may be received in any suitable manner. For example, the matrix barcode may be provided to client 102 in a file (e.g., an image file), an email, or a webpage.

At step 208, a video output port of client 102 is coupled to a video input port of telepresence system 104a. The video output port may be part of video interface 121 and may be configured to transmit video signals across a cable coupled to the video output port. As an example, the video output port of client 102 may include a VGA, DVI, or HDMI connector. The video output port of client 102 could also be a communication interface, such as communication interface 118 that wirelessly transmits a video stream or image from client 102 to telepresence system 104a.

At step 210, the video output port of client 102 is configured to transmit a video stream associated with client 102. The video stream of client 102 may be generated by processor 114, video interface 121, and/or other suitable components of client 102. The video stream may include a series of images. For example, the video stream may be the video stream that is displayed by display 119 of client 102 during normal operation of client 102. As another example, a video stream that is different from that shown by display 119 may be transmitted through the video output port to telepresence system 104a. In particular embodiments, the contents of the video stream is determined by an operating system running on client 102. Configuring the video output port of client 102 to transmit the video stream may include enabling a video output. For example, an operating system of client 102 may initiate a presentation mode or may mirror the video stream shown on display 119 to an external device through the video output port.

At step 212, an image of the matrix barcode received at step 206 is inserted into the video stream and transmitted to telepresence system 104a. As an example, if the video stream transmitted to the endpoint is the same video stream displayed by display 119 or a video output of client 102 is viewable on display 134 of telepresence system 104a, the user of client 102 may open a file, email, webpage, or other module that includes an image of the matrix barcode. This image will then be included in the video stream transmitted to telepresence system 104a. As another example, if client 102 generates a video stream for display by display 119 and a distinct video stream that is transmitted to telepresence 104a, a program of client 102 may insert an image of the matrix barcode into the video stream transmitted to the telepresence system 104a. The image of the matrix barcode may be present in the video stream (e.g., displayed) for any suitable amount of time. In general, the image should be present long enough for the telepresence system 104a to capture the image for analysis. The analysis performed on the image is explained in further detail in connection with FIG. 3.

As an alternative to steps 208, 210, and 212, the matrix barcode may be displayed by display 119 of client 102. The display 119 may be placed within a line of sight of a camera of telepresence system 104a. The camera may capture an image of the matrix barcode and process the image.

Particular embodiments may repeat the steps of the method of FIG. 2, where appropriate. Moreover, although this disclosure describes and illustrates particular steps of the method of FIG. 2 as occurring in a particular order, this disclosure contemplates any suitable steps of the method of FIG. 2 occurring in any suitable order. For example, step 208 may be performed before step 202. Furthermore, although this disclosure describes and illustrates particular components, devices, or systems carrying out particular steps of the method of FIG. 2, this disclosure contemplates any suitable combination of any suitable components, devices, or systems carrying out any suitable steps of the method of FIG. 2.

Figure 3:
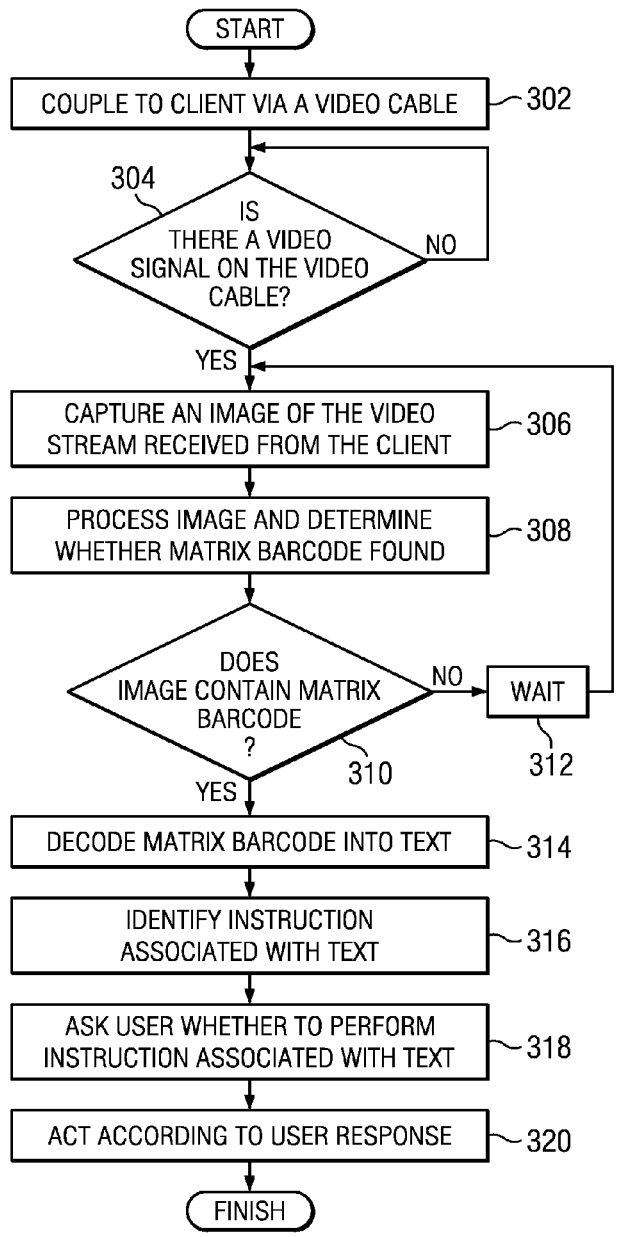
FIG. 3 depicts an example method for communicating using a matrix barcode that may be performed by the telepresence system of FIG. 1.

FIG. 3 depicts an example method for communicating using a matrix barcode. Although the steps of the method are illustrated herein as being performed by telepresence system 104a, any suitable endpoint may perform one or more of the steps of the method. Similarly, though the description of the method contemplates communication between client 102 and telepresence system 104a, the communication may occur between any two suitable endpoints. The method begins at 302, where telepresence system 104a is coupled to client 102 via a video cable. A video cable is any suitable wired connection capable of transmitting video data. Any suitable video cable may be used, such as a VGA, DVI, or HDMI video cable.

At step 304, it is determined whether a video signal is being transmitted by the video cable. If there is no video signal transmitted by the video cable, then the method may return to step 304 and again check the video cable for a video signal. In particular embodiments, telepresence system 104a may wait a suitable amount of time before checking the video cable for the video signal in order to conserve power and computing resources. Upon detecting a video signal, the method moves to step 306.

At step 306, an image of the video stream received from client 102 is captured. For example, a screen shot or frame of the video stream may be obtained. This image may have any suitable format and file extension, such as .bmp, .jpeg, .tiff, .png, or .gif. For example, the image may be a bitmap.

As an alternative to steps 302, 304, and 306, a camera of telepresence system 104a may capture an image displayed by display 119 of client 102. For example, the camera may take a still photo of display 119 or may capture a video stream of display 119 and then obtain a screen shot or frame of the video stream to generate the image.

At step 308, the image is processed to determine whether the image includes a matrix barcode. The image may be processed in any suitable manner. For example, the image may be sent to an analyzer that processes the image to determine if at least a portion of the image comprises a matrix barcode. At step 310, it is decided whether the image contains a matrix barcode. If the image does not contain a matrix barcode, the method moves to step 312, where the method pauses for a predetermined period of time and then moves back to step 306 in order to capture and analyze another image. If at step 310 it is decided that the image does contain a matrix barcode, the method moves to step 314 where the matrix barcode is decoded into text. If the encoding and decoding is accomplished successfully, the decoded text will be the same text that client 102 requested to be encoded.

Any suitable method may be used to decode the matrix barcode into text. For example, the image with the matrix barcode may be passed to a library that converts the image to text. As an example and not by way of limitation, the library used to convert the matrix barcode into text may utilize the Zebra Crossing open-source library. In particular embodiments, the image is passed directly to a text conversion tool, rather than first being analyzed to determine whether the image contains a matrix barcode. If the image does not contain a matrix barcode, then the text conversion tool may indicate that it could not convert the image into text or may provide invalid text.

At step 316, an instruction associated with the text is identified. As an example, the text itself may specify an instruction. As another example, telepresence system 104*a* may infer an instruction based on the decoded text. For example, if the decoded text includes user credentials, telepresence system 104*a* may infer that a login instruction that logs client 102 into telepresence system 104*a* should be performed. Similarly, if the decoded text is a telephone number or a URI, telepresence system may infer that the telephone number should be dialed or the URI accessed.

At step 318, telepresence system 104*a* asks a user associated with client 102 whether to perform the instruction associated with the text. Telepresence system 104*a* may prompt the user in any suitable manner. For example, telepresence system 104*a* may display the instruction on display 134 along with a request that the user indicate whether the instruction should be performed. The user may provide feedback to telepresence system 104*a* via any suitable manner, such as communication interface 128 or communication interface 118. As another example, telepresence system 104*a* may transmit the prompt to client 102 to display or otherwise communicate the request to the user. At step 320, telepresence system 104*a* receives an indication from the user of whether to perform the instruction and acts in accordance with the instruction. For example, if the user indicates the instruction is not to be performed, telepresence system 104*a* may go back to step 306 to capture and analyze new images at predetermined intervals. As an alternative to steps 318 and 320, telepresence system 104*a* may omit requesting user confirmation and may perform the instruction upon identification of the instruction at step 316.

Particular embodiments may repeat the steps of the method of FIG. 3, where appropriate. Moreover, although this disclosure describes and illustrates particular steps of the method of FIG. 3 as occurring in a particular order, this disclosure contemplates any suitable steps of the method of FIG. 3 occurring in any suitable order. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

In particular embodiments, telepresence system 104*a* is configured to capture and analyze images for matrix barcodes while it is not engaged in a communication session with other telepresence systems 104 but may stop capturing and analyzing during such communication sessions. In other embodiments, telepresence system 104*a* may only capture and analyze images for matrix barcodes when a client is not logged into telepresence system 104*a*. In yet other embodiments, telepresence system 104*a* may continually capture and analyze images, regardless of the mode of telepresence system 104*a*.

Modifications, additions, or omissions may be made to the systems, apparatuses, and methods disclosed herein without departing from the scope of the invention. The components of the systems may be integrated or separated. Moreover, the operations of the systems may be performed by more, fewer, or other components. Additionally, operations of the systems may be performed using any suitable logic comprising software, hardware, and/or other logic. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A telepresence system comprising:
   a memory configured to store computer executable instructions; and
   one or more processors coupled to the memory, the processors configured, when executing the instructions, to:
   receive a video stream from a client via a video cable, the video stream including an image generated by the client;
   determine that the image includes a matrix barcode;
   decode the matrix barcode into text, the text specifying user credentials of a user associated with the client; and
   provision the telepresence system for the client in response to a determination that the user credentials are valid.

2. A method, comprising:
   receiving, by an endpoint from a client, an image generated by the client;
   determining, by the endpoint, that the image generated by the client includes a matrix barcode;
   decoding, by the endpoint, the matrix barcode to determine one or more instructions associated with text encoded within the matrix barcode; and
   performing the one or more instructions associated with the encoded text;
   receiving a video stream from the client, the video stream including the image generated by the client; and
   wherein the video stream is received over a Video Graphics Array (VGA), Digital Visual Interface (DVI), or High-Definition Multimedia Interface (HDMI) video cable coupled between the endpoint and the client.

3. The method of claim 2, wherein the video stream is received from the client while the video stream is displayed by the client.

4. The method of claim 2, wherein determining that the image generated by the client includes a matrix barcode comprises determining that the image includes a Quick Response (QR) code.

5. The method of claim 2, wherein the text encoded within the matrix barcode is one or more user credentials of a user associated with the client.

6. The method of claim 5, wherein the performing the one or more instructions associated with the encoded text includes:
   verifying the user credentials with a login server connected to the endpoint through a network; and
   providing the client with access to one or more functions of the endpoint in response to the verification of the user credentials.

7. The method of claim 5, wherein the performing the one or more instructions associated with the encoded text includes customizing the endpoint according to one or more customization parameters associated with the login information.

8. The method of claim 2, further comprising:
    displaying a prompt querying whether the one or more instructions should be performed; and
    wherein the one or more instructions are performed after receiving a positive response to the displayed prompt.

9. The method of claim 2, wherein the image is a first image and the method further comprises:
    capturing a second image generated by the client;
    determining that the second image generated by the client does not include a matrix barcode; and
    capturing the first image upon waiting a predetermined period of time after the second image is captured or after the determination that the second image generated by the client does not include a matrix barcode.

10. The method of claim 2, wherein the performing the one or more instructions associated with the encoded text includes establishing a communication session with one or more users that are distinct from a user of the client.

11. The method of claim 2, wherein the endpoint is a computing system that includes a processor capable of facilitating a videoconference session with another endpoint.

12. One or more computer readable tangible media comprising logic that when executed is operable to:
    receive, from a client, an image generated by the client;
    determine that the image generated by the client includes a matrix barcode;
    decode the matrix barcode to determine one or more instructions associated with text encoded within the matrix barcode; and
    perform the one or more instructions associated with the encoded text;
    wherein the image is received in a video stream from the client; and
    wherein the video stream is received over a Video Graphics Array (VGA), Digital Visual Interface (DVI), or High-Definition Multimedia Interface (HDMI) video cable coupled between the endpoint and the client.

13. The media of claim 12, wherein determining that the image generated by the client includes a matrix barcode comprises determining that the image includes a Quick Response (QR) code.

14. The media of claim 12, wherein the text encoded within the matrix barcode is one or more user credentials of a user associated with the client.

15. The media of claim 12, wherein the logic is further configured to receive the image by capturing a photo or video of a display of the client.

* * * * *